(12) United States Patent
Franzen et al.

(10) Patent No.: US 6,973,287 B2
(45) Date of Patent: Dec. 6, 2005

(54) APPARATUS AND METHOD TO IMPLEMENT A FLEXIBLE HUB-SPOKE SATELLITE COMMUNICATIONS NETWORK

(75) Inventors: Daniel R. Franzen, Hermosa Beach, CA (US); Daniel R. Lane, Santa Monica, CA (US); Nicholas F. DiCamillo, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 412 days.

(21) Appl. No.: 10/044,131

(22) Filed: Jan. 11, 2002

(65) Prior Publication Data

US 2003/0134592 A1    Jul. 17, 2003

(51) Int. Cl.[7] .............................................. H04B 7/185
(52) U.S. Cl. .............. 455/12.1; 455/67.11; 455/67.14; 455/427; 455/428; 455/429; 455/430; 370/316; 244/158 R
(58) Field of Search ............................... 455/12.1, 13.1, 455/17, 22, 67.4, 13.3, 67.5, 67.11, 67.14, 455/428, 430, 427, 429; 342/368, 374, 372; 343/757; 370/316; 244/158 R

(56) References Cited

U.S. PATENT DOCUMENTS

| | | | | |
|---|---|---|---|---|
| 5,194,874 | A | * | 3/1993 | Perrotta ..................... 343/757 |
| 6,067,453 | A | * | 5/2000 | Adiwoso et al. ............ 455/430 |
| 6,175,719 | B1 | * | 1/2001 | Sarraf et al. ............... 455/13.1 |
| 6,211,835 | B1 | | 4/2001 | Peebles et al. |
| 6,215,452 | B1 | | 4/2001 | Chandler et al. |
| 6,233,433 | B1 | * | 5/2001 | Norin ...................... 455/67.14 |
| 6,236,375 | B1 | | 5/2001 | Chandler et al. |
| 6,288,673 | B1 | * | 9/2001 | Dolmeta et al. ............ 342/374 |
| 6,442,148 | B1 | * | 8/2002 | Adams et al. .............. 370/325 |
| 2002/0032003 | A1 | * | 3/2002 | Avitzour et al. ........... 455/12.1 |

* cited by examiner

*Primary Examiner*—Nay Maung
*Assistant Examiner*—Raymond Dean
(74) *Attorney, Agent, or Firm*—Tarolli, Sundheim, Covell & Tummino L.L.P.

(57) ABSTRACT

A multi-beam satellite comprises an input section receiving a plurality of first spot beams and an output section transmitting a plurality of second spot beams. A payload architecture is coupled between the input section and output section. It flexibly and selectively switches and filters the first plurality of spot beams received by the input section and provides signals to the output section to be transmitted as the second plurality of spot beams.

21 Claims, 7 Drawing Sheets

APPARATUS AND METHOD TO IMPLEMENT A FLEXIBLE HUB-SPOKE SATELLITE COMMUNICATIONS NETWORK

BACKGROUND OF THE INVENTION

1. Field of Invention

This invention relates generally to the field of communications. In particular, the invention relates to apparatus and methods to implement a flexible hub-spoke satellite communications network.

2. Discussion of the Related Art

Conventionally, communication satellites were confined to telephone communications. However, all forms of communication are now being relayed by geo-synchronous satellites including, but not limited to, voice, data, video, television, and radio. Several major industries are heavily dependent upon reliable satellite communications service being continuously available. FIG. 1 is an illustration of a conventional satellite communications network in which two satellites provide redundancy for communications. Satellites 620 and 640 communicate with ground stations 630 located within a region of Earth 610 using a uniform coverage distribution methodology. This uniform coverage distribution methodology would allow for communications to an entire region of Earth 610, such as, but not limited to, North America. If one of satellite 620 or satellite 640 should ever fail, then the other satellite takes over its communications function. However, this redundancy is expensive to implement since two satellites must be used just in case one fails. Further, should demand increase in one location, it may not be possible to reconfigure the satellites in orbit to handle the additional load from the increased traffic seen in one area. In addition, building excess capacity in a satellite may not be possible at the time the satellite is being designed since that may be more than one year in advance of launch. There may be uncertainty in market demand at that time.

One mechanism utilized to overcome the foregoing problems of redundancy and capacity has been to utilize multiple feeds to form multiple spot beams to target specific locations on Earth 610. Conventionally, only a relatively small number of feeds could be placed within a single antenna due to the large feed horn size. However, as illustrated in U.S. Pat. No. 6,211,835, U.S. Pat. No. 6,215,452 and U.S. Pat. No. 6,236,375, assigned to the assignee of this patent application and hereby incorporated by reference in their entirety, it is now possible to have a large number of spot beams in which each spot beam individually targets specific locations on Earth 610 using what is hereinafter referred to as hemispherical earth coverage antenna. Also, different signals can be switched within the payload to receive/transmit from/to different feeds.

FIG. 2 is an example illustration of spot beams positioned over predefined Earth locations in a non-uniform coverage distribution utilizing the previously mentioned hemispherical earth coverage. A satellite 710 is shown located at 47 degrees west longitude. Satellite 710 positions its spot beams 740 to cover South America and the east coast of the United States. Further, the positioning of the spot beams is dependent upon the physical alignment of the feeds in the antenna of the satellite and the longitude at which the satellite is positioned in geo-synchronous orbit as detailed in U.S. Pat. Nos. 6,211,835; 6,215,452; and 6,236,375 incorporated herein by reference in their entireties. Once the feeds are set within a satellite they may not be changed individually to target another geographical location. However, unlike a uniform coverage distribution methodology, the spot beams may be directed towards those areas where demand is highest and profitability maximized. Therefore, the positioning of feeds to generate spot beams is critical in determining the profitability of a satellite communications network.

Spot beam broadband systems frequently divide the system's capacity into beam groups. In a typical system, each group consists of a number of coverage regions on the ground and the related satellite resources allocated to serving these regions. For hub-spoke networks, there is an uplink generated from one site, the gateway. Conventional hub-spoke systems generally require the gateway to be within a pre-determined coverage area. The payload on the satellite can have switches to change the location from which a spot beam is transmitted or received, and individual examples of switching are common. Systems historically have pre-defined how spectrum was to be allocated among the coverage areas and hard-wired power-dividers, power-divide modules or other modules were used to allocate uplink bandwidth. The problem with this approach is that demand for the system is highly uncertain, and it is likely that some cells will have over-allocated resources while others will have under-allocated resources. The result is a lower ability to sell capacity and sharply lower system revenues. There is a need for a more flexible approach to on-orbit, reallocate satellite uplink channel bandwidth among cells in a group.

While in orbit, satellites need to be tested to ensure they continue to perform as expected. This may involve a discrete testing phase in which a satellite manufacturer needs to prove that the satellite still functions and performs as required by the original specifications. A satellite may need to be proven to function and perform properly in order to be declared operational. This testing phase is often called an in-orbit test (IOT) phase and may include Receive Gain to System Temperature ratio (G/T), Effective Isotropic Radiated Power (EIRP), bandwidth, and uplink and downlink carrier to interference (C/I) ratio.

Systems with hard-wired connectivity are difficult to test. A conventional method for testing a satellite is by transmitting a beam or signal up to the satellite and having the satellite relay that signal back down to a ground station or test station located on Earth. Parameters of the received signal may then be compared against parameters of the signal that was originally transmitted up to the satellite. Traditional satellites may only have a few beams and testing can be performed from one or a small number of ground station locations. However, when a satellite is capable of receiving and transmitting a large number of beams then logistical problems may occur during the testing phase. In such a circumstance, it may be expensive and extremely difficult and laborious to test each uplink beam and each downlink beam. It may be necessary for each beam to transmit a signal up to the satellite and have the signal relayed back down to Earth in a second beam. This may entail an exceptionally large number of ground stations or test stations to be positioned at different locations around Earth corresponding to each beam under test. This type of testing is extremely laborious as it may involve a large number of ground stations for transmitting or receiving the beams. On-board test signal generators are also known, but this solution is also expensive. It is therefore desirable to provide a means for more efficiently testing multi-beam satellites.

BRIEF SUMMARY OF THE INVENTION

The preferred embodiments involve a satellite communications network having the maximum feasible bandwidth and on-orbit capacity reallocation capability. This general objective is provided by a practical and simple implementation of the on-orbit flexibility enabled by modern antenna designs which is low cost, low mass and low power.

An objective of the preferred embodiments is to provide a hub-spoke communications network based on a multi-beam satellite that can on-orbit, for an uplink beam, pull off signal information, in real-time from each spot beam within a chosen group and input the signal information into a flexible uplink implementation. The flexible uplink implementation selects a combination of spot beams and processes the desired uplink capacity for each beam. Such a network provides maximum bandwidth and on-orbit reallocation of channel capability between spot beams in any chosen beam group.

The preferred embodiments also seek to eliminate the cost and mass of an on-orbit test unit, or the expense of multiple test sites. The preferred embodiments provide the ability to test from a single site via connectivity switching.

In a first aspect of the invention, the flexible uplink implementation allows on-orbit reassignment of uplink bandwidth among a group of user cells. The signal from a given spot beam is power divided and routed to a set of switches and a multiplexer. The switches and multiplexer may select the signal, filter the signal, and combine it with other signals. The combined signal will then be amplified, and transmitted via a downlink beam.

In a second aspect of the invention, the switches and multiplexer provide an inexpensive, on-orbit method to enable a spot beam by spot beam checkout and test. The flexible uplink allows connectivity, for test purposes only, of the uplink from each cell to the downlink to the same cell. In other words, it allows each cell to act as a gateway in terms of uplink signal connectivity. This allows testing of all spot beams from a single test site—the site generates an uplink and observes the downlink. Performance within each beam is tested by re-pointing the satellite antennas in a scan pattern. Each beam can be tested this way in turn by repositioning the beams and commanding the appropriate uplink connectivity. This configuration allows the test signal from one earth station to be used to test each satellite spot beam one by one. This allows each user beam to look like the gateway for the purposes of test.

Other objectives, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals represent like elements and wherein.

DETAILED DESCRIPTION OF THE INVENTION

The preferred embodiments of the present invention will now be described with respect to a multi-beam satellite that includes an input section set to receive a plurality of beams in a beam group (from Earth) and an output section set to transmit a plurality of beams in a beam group (to Earth). A payload architecture is coupled between the input section and the output section. The payload architecture includes a flexible implementation to provide a combination of switching and filtering signals corresponding to the first plurality of beams (i.e., uplink beams) received at the input section and routed to the output section to be transmitted as the second plurality of beams (i.e., downlink beams)to give specific desired operational benefits. The preferred embodiments are merely exemplary, and are in no way intended to limit the invention or its applications or uses. The terminologies of signal, signals, beam or beams may be used throughout and are meant to be interchangeable.

Before describing details thereof, a brief overview of an exemplary satellite payload architecture will be provided. The exemplary satellite payload architecture is capable of receiving high frequency uplink beams at a plurality of receive antennas, converting the higher frequency to a lower frequency for switching of channels, converting the lower frequency signals to a higher frequency, and distributing the high power signals to one of the plurality of transmit antennas.

Figure 1:
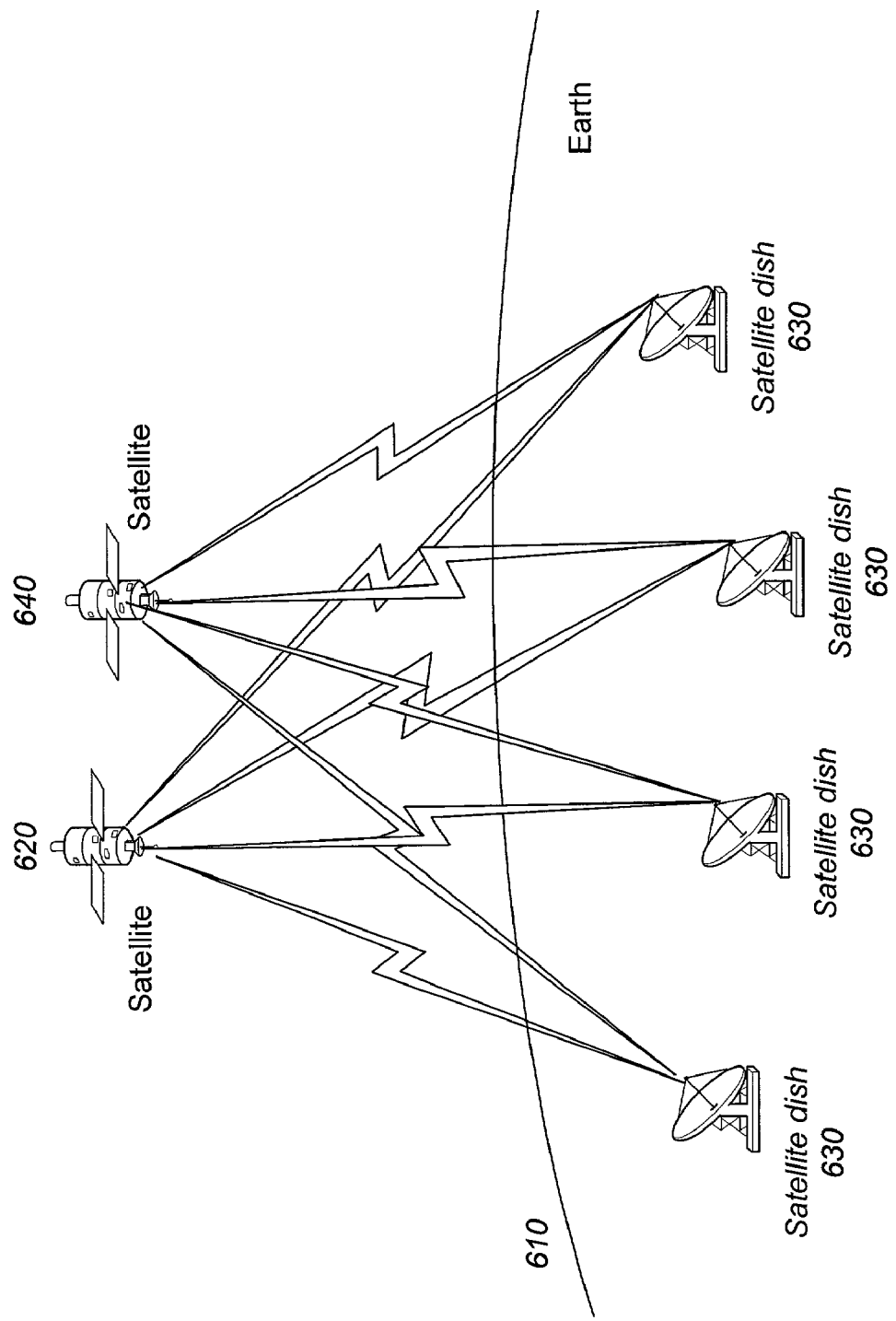
FIG. 1 is an illustration of a conventional satellite communication network having two satellites providing total redundancy.
Figure 2:
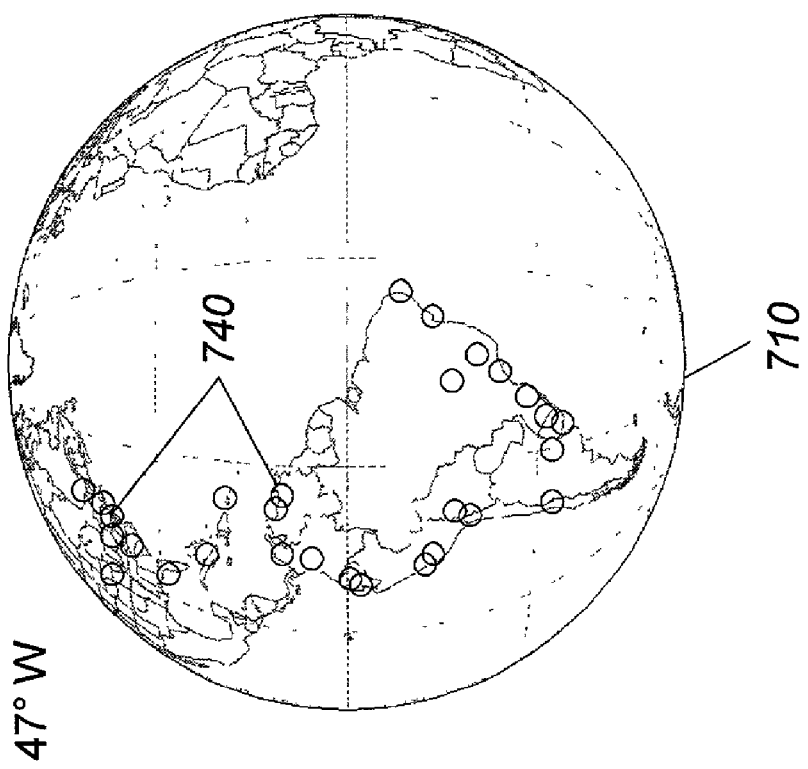
FIG. 2 is an example illustration of spot beams positioned over predefined Earth locations utilizing a hemispherical earth coverage antenna.
Figure 3:
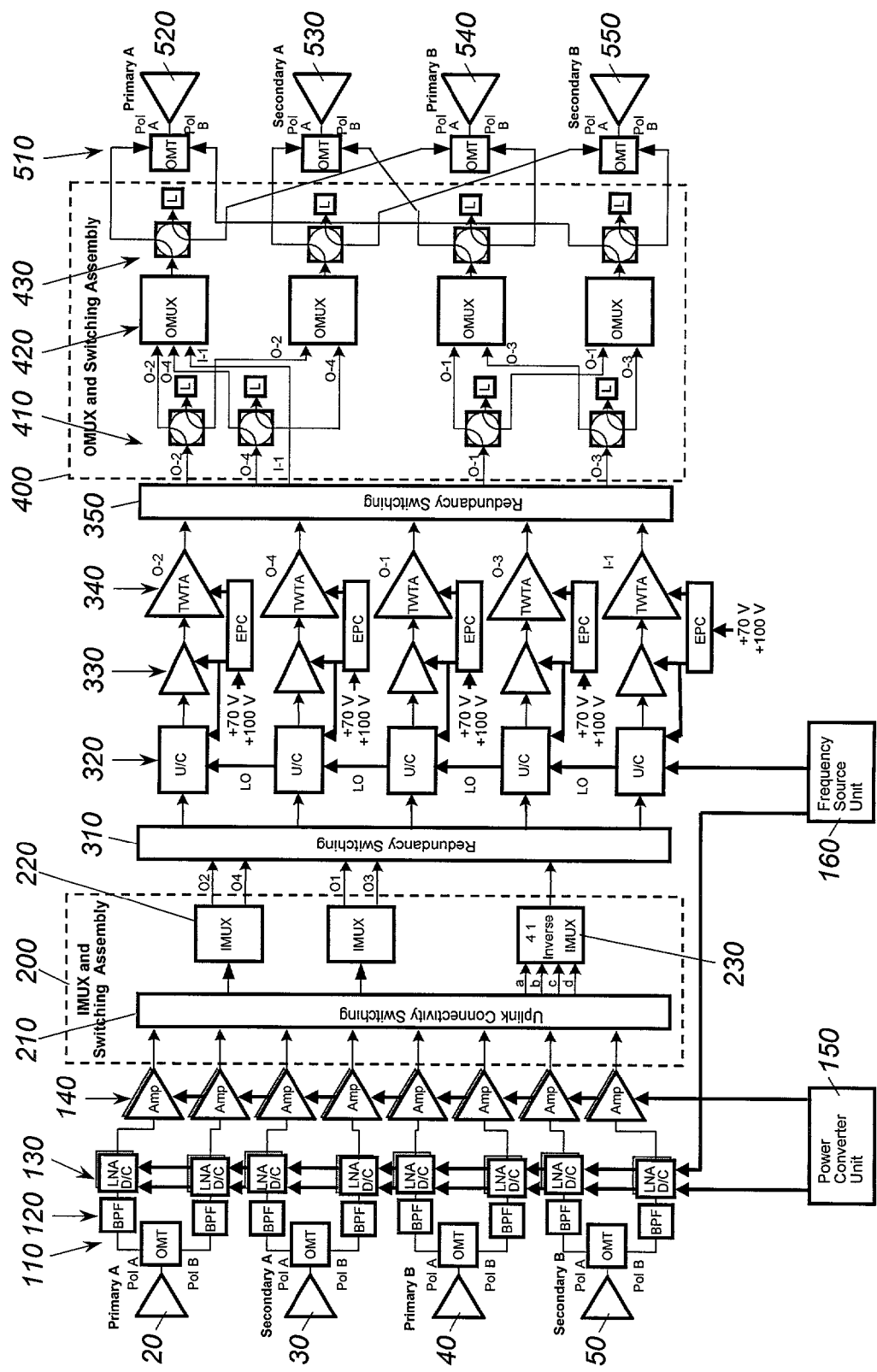
FIG. 3 is a block diagram of the payload circuitry in the example embodiments of the invention.

FIG. 3 is a block diagram illustrating electronics in a payload for one beam group of a multi-beam satellite according to the preferred embodiments of the present invention. The satellite payload may include similar electronics for each of the other beam groups. The satellite may include various types of antenna structures for receiving and transmitting numerous beam groups, for example, eight beam groups. For example, there may be a first antenna or antenna set to receive uplink spot beams and a second antenna or antenna set to receive downlink spot beams. Alternatively, there may be one or more shared antenna apertures, each receiving and transmitting uplink and downlink spot beams.

FIG. 3 shows a first dual-polarization antenna 20, a second dual-polarization antenna 30, a third dual-polarization antenna 40 and a fourth dual-polarization antenna 50 each to receive uplink beams from Earth in a well-known manner. Upon receipt of the uplink signals (such as broadband communication signals) at the antennas, the received signals pass through four ortho-mode transducers (OMT) 110 to eight band pass filters (BPF) 120. The filtered signals may pass to eight low noise amplifier down-converters (LNA D/C) 130 that convert the received and filtered signals from a higher frequency (such as approximately 30 GHz in the Ka-band) to a lower frequency (such as approximately 4 or 5 GHz in the C-Band).

The lower frequency C-Band signals may then be amplified by eight C-Band utility amplifiers 140 and proceed to an Input Multiplexer (IMUX) and switching assembly 200. The IMUX and switching assembly 200 may include an uplink 4:2 connectivity switching network 210, which may be a power dividing switching network. Signals output from the uplink 4:2 connectivity switching network 210 may be input to either one of the two outbound input multiplexers (IMUX) 220 or to the 4:1 inverse IMUX 230. The IMUXs' 220 outputs O1, O2, O3, and O4 are connected to a C-Band redundancy switching network 310. The 4:1 inverse IMUX 230 output I1 is connected to the C-Band redundancy switching network 310.

The C-Band redundancy switching network 310 outputs are connected to five up-converters (U/C) 320. The U/Cs 320 convert the lower frequency signals to higher K-band frequency signals (such as approximately 20 GHz) that will be used for transmission back to the Earth. The higher frequency K-band signals may then pass through five K-band linearized channel amplifiers 330 and five TWTAs 340. The five TWTAs 340 are high power amplifiers that supply the transmit RF power to achieve the downlink transmission. The five TWTAs 340 output four high power outbound signals O-1, O-2, O-3, O-4 to the users and one inbound signal I-1 to the gateway (not shown). The K-band redundancy switching network 350 connects the outbound signals O-1, O-2, O-3 and O-4 to an Output Multiplexer (OMUX) and switching assembly 400.

The OMUX and switching assembly 400 may include mechanical switches 410 that couple the outbound signals O-1, O-2, O-3 and O-4 to outbound multiplexers (OMUX) 420. The signals pass through the OMUXes 420 and are appropriately distributed to mechanical switches 430. The switches 430 distribute the outbound signals to one of the downlink OMTs 510 and the corresponding downlink antenna such as a first dual-polarization downlink antenna 520, a second dual-polarization downlink antenna 530, a third dual-polarization downlink antenna 540 and a fourth dual-polarization downlink antenna 550.

A power converter unit 150 may also be provided to supply DC power to the LNA D/Cs 130 and the C-Band utility amplifiers 140. Additionally, one centralized frequency source unit 160 supplies a local oscillation (LO) signal to the LNA D/Cs 130 and to the U/Cs 320. The power converter unit 150 and centralized frequency source unit 160 are shared across all beam groups of the satellite.

The IMUX and switching assembly 200 and the OMUX and switching assembly 400 operate to appropriately switch and filter uplink signals from any one of the uplink antennas 20, 30, 40 and 50 to any one of the downlink antennas 520, 530, 540 and 550. While FIG. 3 shows one embodiment for the IMUX and switching assemblies 200 and one embodiment for the OMUX and switching assembly 400, other embodiments and configurations are also within the scope of the present invention. The IMUX and switching assembly 200 operates at lower frequency (such as 4 GHz) than the OMUX and switching assembly 400.

Figure 4:
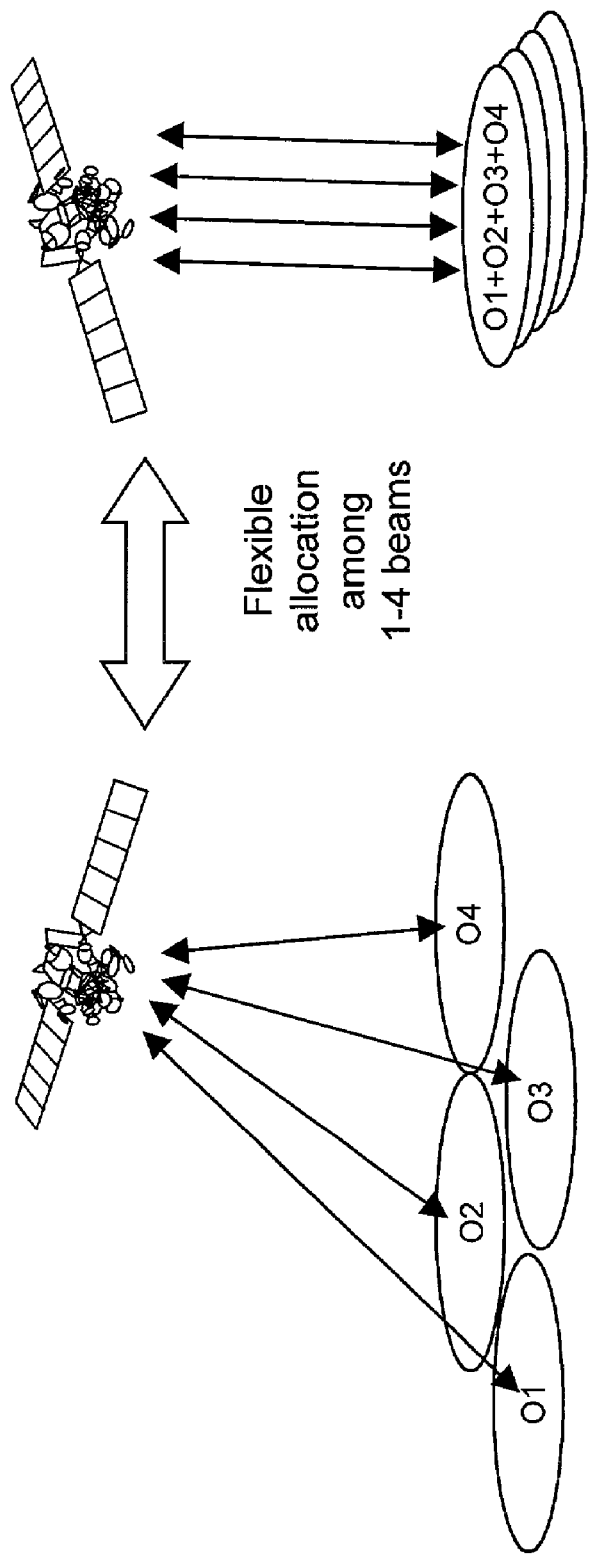
FIG. 4 is a diagram illustrating the flexibility of capacity in a satellite in order to re-allocate capacity within a geographical area where demand has unexpectedly changed.

FIG. 4 is a diagram conceptually illustrating the feature of flexibly allocating spot beam capacity of a satellite on-orbit in order to increase the capacity for a geographical area. This flexible allocation may be desirable, for example, because demand has increased in the geographical area. The satellite is depicted with four spot beams as typically covered by the feeds located within one or more of the antennas of the satellite. As indicated in FIG. 4, each of the signal O1, O2, O3, and O4 may be directed to a different geographical area, or all signals may be concentrated to any one geographical area. FIG. 4 illustrates an extreme signal re-allocation scenario, and many other combinations of signal distribution are possible. Therefore, when demand rises within a particular area it is possible to have additional signals routed to the higher demand area, while taking signals away from other areas in the beam group. Altering the group of feeds which are active at any given moment in time can be done utilizing commandable switches on-board the satellite. For instance, two transponders could be provided to a high-priority beam and one transponder could be allocated to each of two lower-demand beams. These configurations can be changed on-orbit.

As discussed further below with respect to FIG. 5, the satellite in the preferred embodiments has eight independent beam groups, each of which provides coverage to four ground cells, for a total coverage of 32 ground cells per satellite. Each beam group has a single active gateway, four outbound transponders, and one inbound transponder. The design is modular, easily accommodating additional beam groups to provide even greater coverage.

The payload architecture allows the distribution of the four outbound transponders in a group among up to four beams. Capacity can be concentrated in one beam, spread among several beams, or spread evenly among all four beams. The distribution can be changed on-orbit. The satellite in the preferred embodiments is a hemispherical earth coverage satellite for use with broadband communications, such as for the Internet. The satellite may include numerous antenna structures (such as disclosed in U.S. Pat. No. 6,236,375) that have a large number of spot beams.

Each beam group supports users in any or all of the four cells in the group and an active gateway in one of two cells in the group. This connectivity is labeled "4:2", as the outbound capacity is distributed among four beams and there are two possible locations for the gateway. In contrast, a "2:1" connectivity allocates the four outbound transponders among two beams, and there is one location for the gateway. The additional hardware needed to deliver 4:2 connectivity is minor since modern antennas accommodate 32 or more beams without modification to the antenna or RF optics. By providing consistently good performance to all beams, this antenna enables the 4:2 flexibility approach by delivering a large number of useful beams.

The 4:2 connectivity can be configured on-orbit to provide all the functionality of the 2:1 connectivity simply by choosing to allocate the four outbound transponders among just two beams and selecting a gateway location. But the 4:2 connectivity offers useful allocations beyond those possible with 2:1 connectivity. Capacity can be spread evenly among the four beams if desired, as illustrated on the left side of FIG. 4. The capacity can also be concentrated into just one cell, as illustrated on the right side of FIG. 4. There, of course, can be intermediate allocations with capacity divided among two or three beams.

By allowing capacity to be spread over four cells, the four-beam grouping provides much greater flexibility in deploying coverage and distributing capacity than two-beam groupings. The connectivity capitalizes on the hemispherical and other wide-field-of-view antennas by doubling the coverage per satellite to cover a broad area initially with lower capacity density. This broad initial capacity provides fast time to market and low initial costs by reducing the risk of under-utilized capacity and providing broad service with a minimum number of satellite launches. A 2:1 architecture sharing four outbound transponders between two beams requires that initial capacity be deployed more densely and therefore requires more satellites to complete the coverage. The 4:2 design can be configured for a two-beam grouping by assigning transponders to the appropriate subset of beams, it offers the flexibility to pursue a continuum of deployment scenarios with varying emphasis on capacity density and coverage. The on-orbit flexibility enables the re-allocation of resources as the communications market evolves and the rollout of services progresses.

Figure 5:
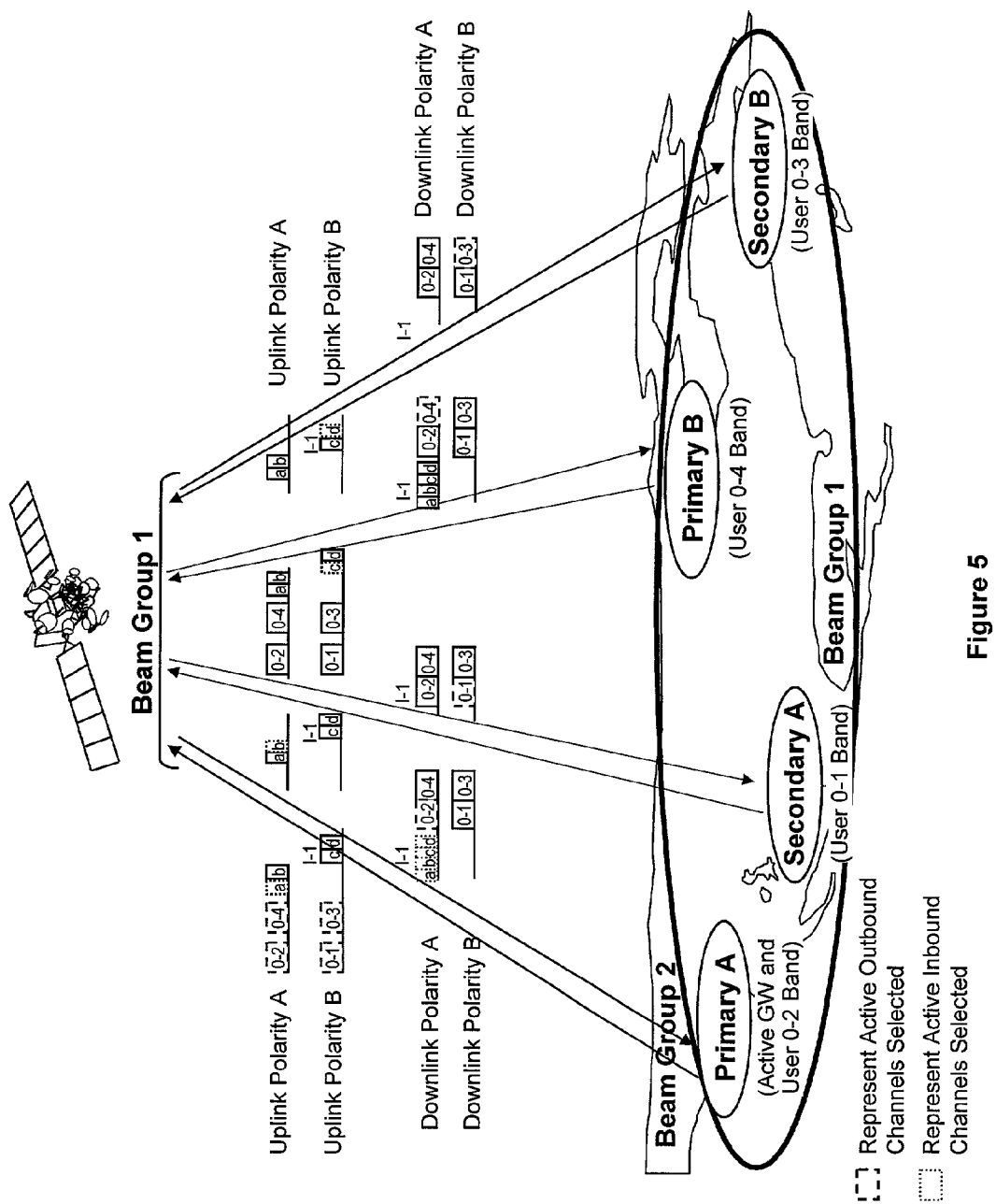
FIG. 5 is a diagram of the beam group flexibility in the example embodiments of the present invention.

As shown in FIG. 5, each of the eight beam groups provides simultaneous two-way communication between a single active gateway in one of two cells and all user terminals in any of four cells. For each beam group, the active gateway may be located in either the Primary A cell or the Primary B cell. Gateway selection is commandable on-orbit, enabling on-orbit service restoration if required. For traffic outbound from the gateway, the payload receives a dual-polarization uplink from the active gateway and downlinks each of the four outbound channels (designated O-1, O-2, O-3, O-4) to user terminals in any of the four ground cells. The example shown in FIG. 5 illustrates each ground cell receiving one outbound channel; however, the payload architecture in the preferred embodiments has the flexibility to route one, two, three, or four outbound channels to any single ground cell, thereby re-allocating capacity on-orbit.

For traffic inbound to the gateway, the payload architecture receives four sub-channel uplinks (designated I-1a, I-1b, I-1c, and I-1d in FIG. 5) from the users in up to four ground cells, corresponding to the four outbound channels. The payload architecture multiplexes the four sub-channels and routes the combined signal to the active gateway. FIG. 5 assumes that an O-2 outbound channel has a corresponding I-1a inbound sub-channel, O-4 corresponds to I-1c, O-1 corresponds to I-1b, and O-3 corresponds to I-1d. However, the payload architecture has the flexibility to change the mapping between outbound channel and inbound sub-channel based on ground commands.

For outbound processing, the multi-beam antenna receives the dual-polarization gateway uplink from either the Primary A or the Primary B cell. The signal on each polarization is down-converted to C-band, amplified, and channelized by a 1:2 IMUX, generating four channels: O-1, O-2, O-3, and O-4. Each of the four channels is then up-converted, gain-controlled, and amplified by a linearized TWTA. The OMUX and Switching Assembly switches and combines the outbound channels as necessary to provide between zero and four channels to each ground cell in the beam group. The signals are then routed to the downlink antenna for transmission to one, two, three, or four cells within the beam group.

Four user uplink inbound sub-channels are received by the multi-beam antenna from either one, two, three, or four of the cells within the beam group. The four sub-channels are routed to 4:1 switches and then to a 4:1 inverse IMUX, where they are combined into one I-1 channel. The I-1 channel is up-converted, gain-controlled, and amplified by a linearized TWTA. The OMUX and Switching Assembly combines the I-1 channel with the appropriate outbound channel, and then switches the signal to the downlink feed servicing the gateway ground cell.

Figure 6:
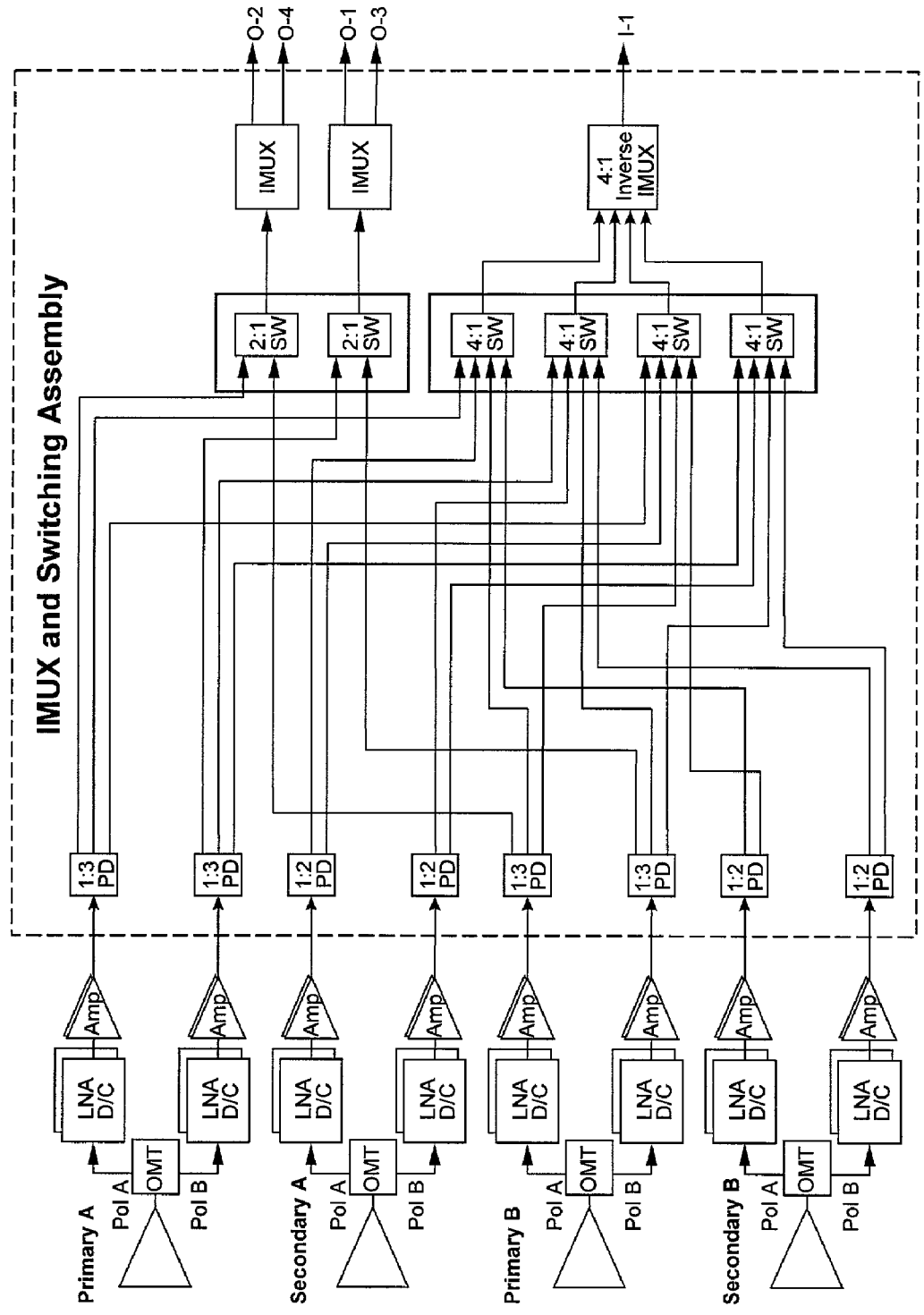
FIG. 6 is a detailed block diagram of a first example of the Uplink 4:2 Connectivity Switching 210 in the payload architecture shown in FIG. 3.

FIG. 6 shows a first example of the details of the Uplink 4:2 Connectivity Switching 210 in the payload architecture of FIG. 3. This uplink implementation allows flexible uplink connectivity and coverage with minimal impacts on the complexity of the payload architecture and no impact on performance.

The signal from each spot beam is power divided in a 1:3 power divider (PD) circuit or 1:2 power divider (PD) circuit. It is then routed to the switches comprised of 2:1 switches (SW) and 4:1 switches (SW). The switches select which uplink signal is subsequently filtered, amplified and transmitted via the downlink as shown in the payload architecture of FIG. 3.

As discussed above, this flexible uplink implementation allows a gateway to be in either of two cells in a group of four cells. User bandwidth can be collected among all four cells, in one cell, or any combination inbetween. The flexible uplink implementation allows on-orbit assignment of bandwidth and connectivity.

Figure 7:
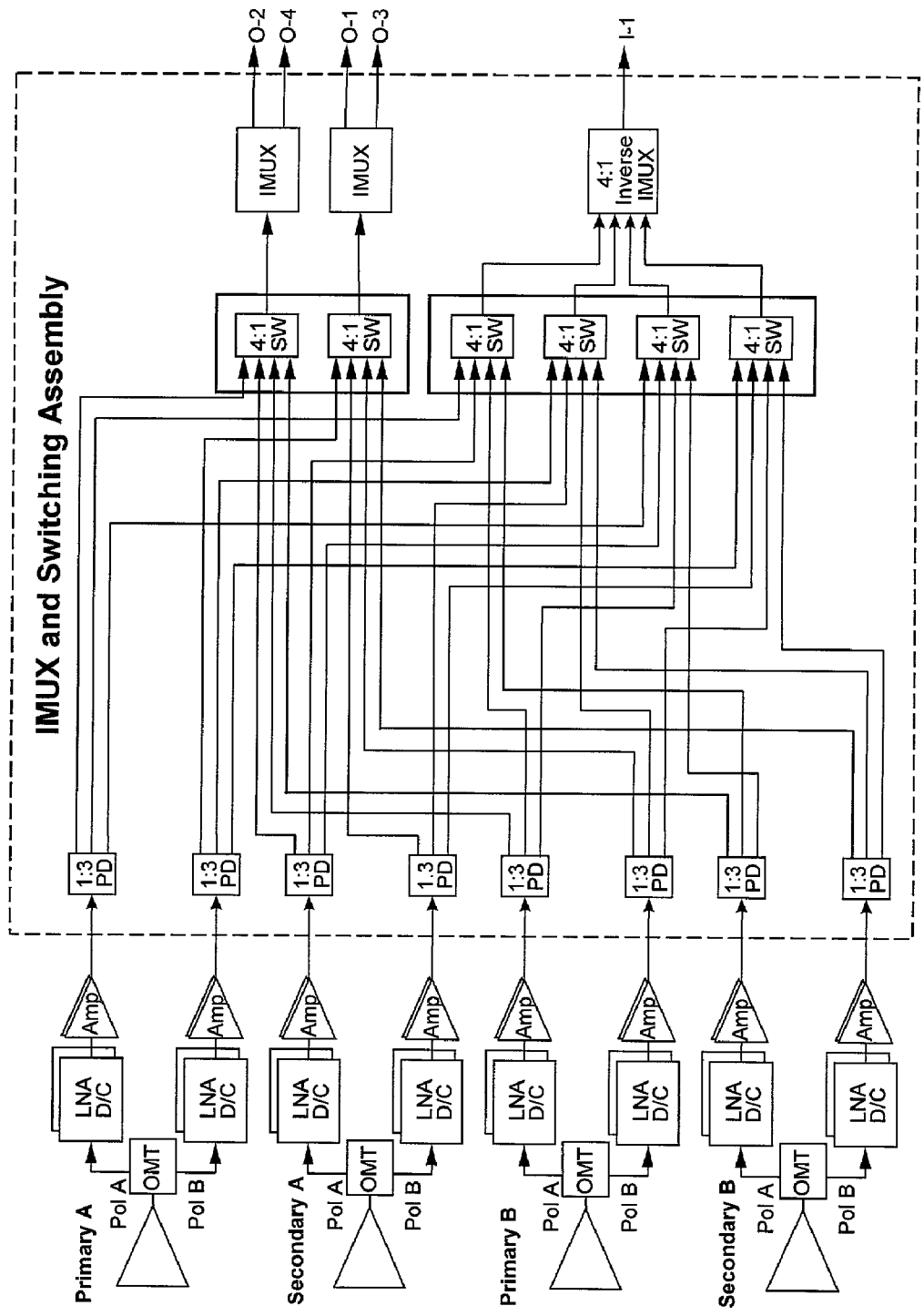
FIG. 7 is a detailed block diagram of a second example of the Uplink 4:2 Connectivity Switching 210 in the payload architecture shown in FIG. 3.

The switching matrix also provides an inexpensive, on-orbit method to enable a spot beam by spot beam checkout and test. A second example of the Uplink 4:2 Connectivity Switching of FIG. 3 is shown in FIG. 7. It allows connectivity, for test purposes only, of the uplink from each cell to the downlink to that same cell.

The extra power division and switching circuits allows the spot beam of any secondary cell (instead of just primary cells) to act as a "gateway" in terms of uplink signal connectivity for test purposes. This allows testing of all spot beams from a single test site—the site generates an uplink and observes the downlink. Performance within each beam is tested by re-pointing the satellite antenna structure in a scan pattern. In the case of separate first and second antennas or antenna sets, the antenna or antenna sets are repositioned. In the case of one or more shared antenna apertures, the shared antenna aperture(s) is repositioned. Each beam can be tested this way in turn by repositioning the spot beams and commanding the appropriate uplink connectivity. This configuration allows the test signal from one earth station to be used to test each satellite spot beam one by one. This allows each user beam to look like the gateway for the purposes of test.

The result is an inexpensive and light method of enabling beam-by-beam testing and checkout of the payload architecture. It avoids the need for an on-board test unit and saves money and mass. It avoids the need for multiple ground stations during testing. There are resulting large savings in time and money during the in-orbit testing phase.

While the invention has been described with reference to specific preferred embodiments, the description of the preferred embodiments is illustrative only and is not to be construed as limiting the scope of the invention. Various other modifications and changes may occur to those skilled in the art without departing from the spirit and scope of the invention.

What is claimed is:

1. A multi-beam satellite comprising:
   an input section to receive a plurality of first spot beams via a plurality of uplink antennas, each of the plurality of uplink antennas being repositionable to receive a test signal transmitted from a single earth station;
   an output section to transmit a plurality of second spot beams via a plurality of downlink antennas, each of the plurality of downlink antennas being repositionable to retransmit the test signal to the single earth station; and
   a payload architecture coupled between said input section and said output section, said payload architecture flexibly and selectively power dividing, switching and filtering signals from said plurality of first spot beams received by said input section and routing the signals to said output section to be transmitted as said plurality of second spot beams, said payload architecture being operative to select any of the plurality of first spot beams to contain a gateway.

2. The satellite of claim 1, wherein said payload architecture switches to select one of said plurality of first spot beams received by said input section to contain a gateway.

3. The satellite of claim 2, wherein said plurality of first spot beams includes a plurality of primary beams and a plurality of secondary beams.

4. The satellite of claim 2, wherein said payload architecture allocates return channels among said plurality of first spot beams by switching and filtering of said plurality of first spot beams.

5. A multi-beam satellite comprising:
an input section to receive uplink signals from a plurality of first spot beams via any one of a plurality of uplink antennas;
an output section to transmit a plurality of second spot beams via any one of a plurality of downlink antennas; and
a payload architecture coupled between said input section and said output section, said payload architecture flexibly and selectively switching and filtering said plurality of first spot beams received at said input section and routing the switched and filtered plurality of second spot beams transmitted by said output section so as to perform testing of each of said plurality of first spot beams and each of said plurality of second spot beams;
wherein said payload architecture selectively switches said plurality of first spot beams to allow any uplink signal to act as a gateway signal for purposes of testing.

6. The satellite of claim 5, wherein said testing is performed using test signals from a single ground station.

7. The satellite of claim 5, wherein said payload architecture allows connectivity, for test purposes only, of one of said plurality of second spot beams corresponding to a cell with one of said plurality of first spot beams corresponding to said cell.

8. The satellite of claim 6, wherein said testing operates in conjunction with a control system to reposition at least one first antenna and least one second antenna so that each one of said plurality of first spot beams and said plurality of second spot beams can be tested from said single ground station.

9. The satellite of claim 5, wherein said plurality of first spot beams includes spot beams corresponding to primary cells and secondary cells, the payload architecture being operative to select any of the primary cells to contain a gateway.

10. The satellite of claim 9, wherein said testing includes testing of first spot beams corresponding to a secondary cell.

11. A method of testing a multi-beam satellite, said method comprising:
receiving a plurality of first spot beams at said satellite via any one of a plurality of uplink antennas;
transmitting a plurality of second spot beams from said satellite via any one of a plurality of downlink antennas;
switching said plurality of first spot beams to allow connectivity of a first spot beam in a cell with a second spot beam in said cell; and
sending a test signal from a single ground station on said first spot beam and receiving the test signal at said second spot beam to test said first spot beam and said second spot beam;
wherein any one of said plurality of first spot beams can act as a gateway for the purposes of testing said first spot beam and said second spot beam.

12. The method of claim 11, further comprising repeating said step of sending a test signal for each one of said plurality of first spot beams and each one of said plurality of second spot beams from said single ground station.

13. The method of claim 12, wherein said satellite comprises a first antenna or antenna set receiving said plurality of first spot beams and a second antenna or antenna set transmitting said plurality of second spot beams, and said first antenna or antenna set and said second antenna or antenna set are repositioned for each pair of one of said plurality of first spot beams and one of said plurality of second spot beams corresponding to a cell.

14. The method of claim 12, wherein said satellite comprises one or more shared antenna apertures receiving said plurality of first spot beams and transmitting said plurality of second spot beams, and said shared antenna aperture is repositioned for each pair of one of said plurality of first spot beams and one of said plurality of second spot beams corresponding to a cell.

15. The multi-beam satellite of claim 1, wherein said power dividing is performed through a plurality of power dividers such that a given signal from said plurality of first spot beams is routed to a plurality of switching devices.

16. The multi-beam satellite of claim 15, wherein the power dividers comprise at least one of a plurality of 1:3 power dividers and 1:2 power dividers.

17. The multi-beam satellite of claim 1, further comprising an inverse multiplexer operative to receive power divided and switched signals from the plurality of first spot beams and combine them into a first combined signal, wherein the first combined signal is transmitted from the output section to a gateway ground cell.

18. The multi-beam satellite of claim 17, wherein the gateway ground cell is covered by one of the second spot beams.

19. The multi-beam satellite of claim 2, wherein the gateway is operative to generate an uplink signal and monitor a downlink signal corresponding to the uplink signal for the purposes of testing.

20. The multi-beam satellite of claim 5, further comprising a plurality of 1:3 power dividers operative to route any of the uplink signals to any of the plurality of second spot beams, such that any uplink signal can act as a gateway beam for purposes of testing.

21. The multi-beam satellite of claim 5, wherein performance of the plurality of first and second spot beams is tested by re-pointing a satellite antenna structure in a scan pattern.

* * * * *